(12) United States Patent
Clements et al.

(10) Patent No.: US 9,448,009 B2
(45) Date of Patent: *Sep. 20, 2016

(54) FLUE GAS RECIRCULATION METHOD AND SYSTEM FOR COMBUSTION SYSTEMS

(71) Applicant: Her Majesty The Queen in Right of Canada as Represented by the Minister of Natural Resources, Ottawa (CA)

(72) Inventors: Bruce Clements, Nepean (CA); Richard Pomalis, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 62 days.

This patent is subject to a terminal disclaimer.

(21) Appl. No.: 14/661,671

(22) Filed: Mar. 18, 2015

(65) Prior Publication Data

US 2015/0219396 A1 Aug. 6, 2015

Related U.S. Application Data

(60) Division of application No. 13/148,268, filed as application No. PCT/CA2010/001954 on Dec. 10, 2010, now Pat. No. 9,033,704, which is a continuation of application No. 12/636,417, filed on Dec. 11, 2009, now abandoned.

(30) Foreign Application Priority Data

Dec. 11, 2009 (CA) ..................................... 2688220

(51) Int. Cl.
*F27B 9/30* (2006.01)
*F23C 9/00* (2006.01)
(Continued)

(52) U.S. Cl.
CPC ............... *F27B 9/3005* (2013.01); *F23C 9/00* (2013.01); *F27B 9/20* (2013.01); *F27B 9/36* (2013.01); *F27D 17/001* (2013.01); *F27D 17/002* (2013.01)

(58) Field of Classification Search
CPC ........ F23C 9/00; F26B 23/002; F26B 23/02; F26B 2200/08; F27B 9/36; F27B 9/3005; F27B 9/20; F27B 9/00
USPC ...... 431/115, 9, 11; 432/152, 128, 133, 176, 432/199; 110/345, 347
See application file for complete search history.

(56) References Cited

U.S. PATENT DOCUMENTS 3,365,339 A 1/1968 Beggs et al.
4,411,204 A 10/1983 Hamilton
(Continued)

*Primary Examiner* — Gregory Huson
*Assistant Examiner* — Nikhil Mashruwala
(74) *Attorney, Agent, or Firm* — Chainey P. Singleton; Daniel J. Chalker; Chalker Flores, LLP

(57) ABSTRACT

A method and system for improving high excess air combustion system efficiency, including induration furnaces, using a re-routing of flue gas within the system by gas recirculation. Flue gas is drawn from hot system zones including zones near the stack, for re-introduction into the process whereby the heat recovery partially replaces fuel input. At least one pre-combustion drying zone, at least one combustion zone, and at least a first cooling zone exist in these furnaces. At least one exhaust gas outlet is provided to each pre-combustion drying and combustion zone. At least part of the gaseous flow from each system zone exhaust outlet is selectively delivered to an overall system exhaust, the remaining flow being selectively delivered via recirculation to cooling zones. Recirculation flow is adjusted to meet required system temperatures and pressures. The method and system provide efficiency improvements, reducing fuel requirements and greenhouse gas emissions.

6 Claims, 4 Drawing Sheets

(51) Int. Cl.
*F27B 9/20* (2006.01)
*F27D 17/00* (2006.01)
*F27B 9/36* (2006.01)

(56) References Cited

U.S. PATENT DOCUMENTS

| | | |
|---|---|---|
| 5,049,067 A | 9/1991 | Hengelmolen |
| 6,702,570 B2 | 3/2004 | Shah et al. |
| 6,776,609 B1 | 8/2004 | Sullivan et al. |
| 7,261,046 B1 | 8/2007 | Retting et al. |
| 2004/0182292 A1 | 9/2004 | Shimrony et al. |
| 2009/0308073 A1 | 12/2009 | Bonaquist et al. |
| 2011/0162382 A1 | 7/2011 | Riensche et al. |
| 2014/0208994 A1* | 7/2014 | Cohen .............. F23J 15/02 110/205 |
| 2016/0169504 A1* | 6/2016 | Uchida .............. F23J 15/06 122/421 |

\* cited by examiner

FLUE GAS RECIRCULATION METHOD AND SYSTEM FOR COMBUSTION SYSTEMS

CROSS-REFERENCE TO RELATED APPLICATIONS

This is a Divisional of U.S. patent application Ser. No. 13/148,268 filed Aug. 5, 2011, which is a U.S. National Stage of International Application No. PCT/CA2010/001954filed Dec. 10, 2010 which claims priority to and the benefit of U.S. patent application Ser. No. 12/636,417, filed Dec. 11, 2009 and Canadian Patent application No. 2688220, filed Dec. 11, 2009. The contents of each of which ar incorporated by reference in their entirety.

FIELD OF THE INVENTION

The invention relates to improvements in the operation and efficiency of furnaces for drying and curing operations and related purposes, in particular those using high levels of excess air. In particular, the invention relates to a method and system of recirculation of flue gas for such furnaces, and has particular applicability for induration furnaces.

BACKGROUND OF THE INVENTION

It is well known that for boilers and heaters, high excess air results in large thermal efficiency losses, and the excess air should be monitored and maintained at specific levels as required to combust the fuel. Traditional excess air levels for fossil fuels are:

Oil 3% (~1% $O_2$ by volume)
Natural Gas 5% (~2% $O_2$ by volume)
Coal 20% (~3% $O_2$ by volume)

These excess air levels could vary slightly depending upon the application. However, there are large numbers of industrial heaters and furnaces that require significantly higher excess air levels which are well beyond what is needed to combust the fuel properly. These levels have conventionally been considered as acceptable and normal within the context of certain processes.

There are numerous reasons for high excess air, including the following.

Firstly, and most commonly, the high excess air may be required to maintain the heat transfer rate of the process. Many applications require high convective rates to transfer heat from the flame and flue gas into a product or heat load, and the proportion of heat transfer which is convective or radiant will vary depending upon the furnace layout and operation.

Secondly, excess air can be used to moderate flame and furnace temperatures. For many applications, typical flame temperatures at close to stoichiometric ratios tend to be around 3600° F., which exceeds the maximum refractory brick operating temperatures—typically 2800° F. or significantly less—so that excess air may be used to maintain the integrity of refractories and other structural elements of the furnace.

Thirdly, in drying and curing applications, the humidity level in the furnace must be controlled, which is conventionally done by increasing the excess air, and thereby lowering the partial pressure of moisture within the process.

Fourthly, excess air can be used to control the levels of flammable vapours which may be released in flue streams, by diluting these vapors well below the lower flammability limit.

The types of combustion applications which typically use high excess air include the following:
Spray and solids drying
Curing
Induration of ore pellets
Annealing
Forging
Heating Large amounts of excess air generally result in very large losses within the process. For example, it has been found that the flue gas in iron ore furnaces may contain oxygen at approximately 19.0% to 19.5% by volume, which corresponds to approximately 1400% to 2100% excess air. The dry gas loss increases exponentially as the $O_2$ in the flue gas approaches the value for the oxygen in air, which is approximately 21% by volume.

In applications such as induration furnaces, very high excess air is required in order to meet the need for convective heat transfer in the various sections of the furnace. In such furnaces, the key heat transfer zone in the furnace is the combustion zone, within which are three primary modes of heat transfer to the product, that is, convection, radiation and conduction. Radiation consists of both direct luminous radiation from the flame envelope as well as cavity radiation within the physical geometry of the zone. Radiation is a strong function of both flame and mean cavity temperature, whereas convection is a strong function of both flue gas velocity and the temperature of the flue gas passing through the pellet bed. The flame temperature will increase if less combustion air is used; however, the convection drops off dramatically. The convection rate must be maintained throughout the bed. The third mode of heat transfer is conduction within the pellet bed.

Within the other zones of the furnace convective heat transfer predominates; however, it is both a function of flue gas velocity through the bed and the temperature of the flue gas. By increasing temperature in these zones slightly it may be possible to maintain a similar heat transfer characteristic within the specific zones while decreasing velocity.

Clearly, any reduction in the amount of excess air used will result in increased efficiency and decreased fuel consumption, with consequent economic benefits. Further, a decrease in excess air will also decrease the amount of flue gas requiring treatment.

From prior art it is known that there are various methods of recirculation of flue gases in combustion systems which do not use high excess air. However, such methods are directed at controlling the flame temperature, NOx, and steam temperatures and are not intended to improve efficiency of high excess air systems.

It has now been found that for high excess air furnaces, such as induration furnaces, controlled and selective recirculation of exhaust gases from the drying, pre-heating, and combustion zones can substantially reduce the amount of excess air required by the system, while maintaining the required convective heat transfer.

The invention therefore seeks to provide a flue gas recirculation system for combustion systems which use high levels of excess air, such as drying, curing, induration and other systems, including but not limited to those noted above. In its most general conception the system uses the heat exhausted in the flue gas and re-introduces it into the process to replace heat input from fuel. The various methods for re-introduction can vary from one process to another. The invention is particularly advantageous for use for induration furnaces. However, although particular reference is made in the discussion below to the specific features and requirements for such furnaces, the features of the invention are equally applicable to such other excess air systems in general.

The invention therefore seeks to provide a flue gas recirculation system for a combustion system, the combustion system comprising in sequence at least one pre-combustion drying zone, at least one combustion zone, and at least a first cooling zone, the recirculation system comprising (i) a plurality of exhaust gas outlets comprising at least one exhaust gas outlet provided respectively to each pre-combustion drying zone and each combustion zone, and constructed and arranged to remove a gaseous flow from each said zone;

(ii) at least one cooling zone intake means provided to each cooling zone;

(iii) at least one flue gas delivery means each having at least one recirculation intake means and at least one delivery outlet, at least one of the plurality of exhaust gas outlets being operatively connectable to one of the recirculation intake means to selectively deliver at least part of the respective gaseous flow as a recirculation flow to the flue gas delivery means, and each delivery outlet being selectively operatively connectable to a selected one of the cooling zone intake means; and (iv) control means operatively connected to the flue gas delivery means to selectively control and direct the recirculation flow.

In one aspect of this embodiment, the at least one exhaust gas outlet operatively connectable to one of the recirculation intake means comprises a selected one of the at least one exhaust gas outlet provided to the least one combustion zone.

Preferably, the at least one pre-combustion drying zone comprises an updraft drying zone and a downdraft drying zone, and in a further aspect of the invention, the at least one exhaust gas outlet operatively connectable to one of the recirculation intake means comprises a selected one of the at least one exhaust gas outlet provided to the least one combustion zone and a selected one of the at least one exhaust gas outlet provided to the updraft drying zone.

Preferably, the combustion system further comprises at least one pre-heating zone.

Preferably also the at least one cooling zone comprises a first cooling zone and a second cooling zone, and the flue gas delivery means is constructed and arranged to deliver the recirculation flow to the cooling zone intake means of the first cooling zone.

Preferably, the combustion system is for an operational use selected from at least one of curing, drying, induration, heating, annealing and forging.

The invention further seeks to provide a method of recirculation of flue gas for a combustion system, the combustion system comprising in sequence at least one pre-combustion drying zone, at least one combustion zone, and at least a first cooling zone, the method comprising the steps of (i) providing a plurality of exhaust gas outlets comprising at least one exhaust gas outlet provided respectively to each pre-combustion drying zone and each combustion zone to allow a gaseous flow selectively to and through each exhaust gas outlet;

(ii) providing at least one cooling zone intake means to each cooling zone;

(iii) providing at least one flue gas delivery means each having at least one recirculation intake means and at least one delivery outlet;

(iv) selecting at least one exhaust gas outlet from the plurality of exhaust gas outlets, and connecting the selected exhaust gas outlet to one of the recirculation intake means;

(v) selectively delivering at least part of the gaseous flow from each selected exhaust gas outlet as a recirculation flow to the flue gas delivery means;

(vi) selectively delivering at least part of the recirculation flow through one of the delivery outlets to the selected cooling zone intake means;

(vii) monitoring at least periodically the temperatures and pressures in each cooling zone receiving the recirculation flow to determine temperature and pressure values; and (iv) adjusting the recirculation flow in response to the determined temperature and pressure values.

In one aspect of this embodiment, step (iv) comprises selecting an exhaust gas outlet from the combustion zone.

In another aspect of this embodiment, the at least one pre-combustion drying zone comprises an updraft drying zone, and step (iv) further comprises selecting an exhaust gas outlet from the updraft drying zone.

The recirculation systems of the invention are compatible with the conventional configurations of many or most high excess air systems, and are particularly advantageous for systems wherein the at least one pre-combustion drying zone comprises an updraft drying zone and a downdraft drying zone; and/or wherein the combustion system further comprises at least one pre-heating zone and/or multiple cooling zones, such that the flue gas delivery means is preferably constructed and arranged to deliver the recirculation flow to the cooling zone intake means of the first of the cooling zones.

As noted above, the recirculation systems of the invention can be used for a wide range of operational end uses, such as at least one of curing, drying, induration, heating, annealing and forging.

BRIEF DESCRIPTION OF THE DRAWINGS

The invention will now be described in relation to the drawings, in which.

DETAILED DESCRIPTION OF THE DRAWINGS

Figure 1:
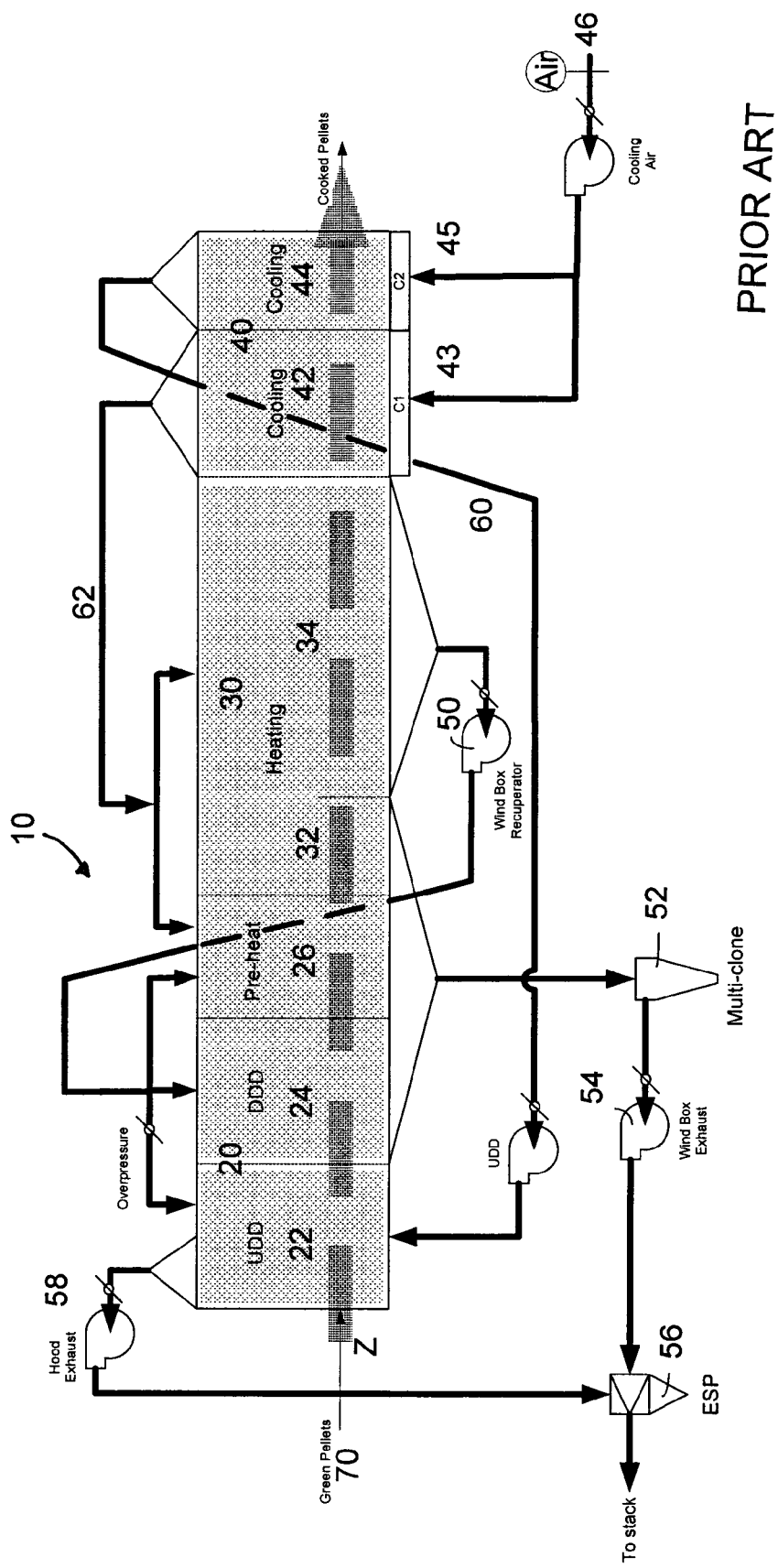
FIG. 1 shows a typical configuration of a conventional high excess air combustion system of the prior art, without recirculation of the flue gas.

Referring first to FIG. 1, a typical configuration of a high excess air combustion system 10 of the prior art is shown, in this case exemplifying an induration furnace, for treating a stream of pellets 70, carried through the system in the direction of arrow Z. The combustion system 10 comprises in sequence (shown here from left to right) a pre-combustion drying zone 20, which is shown as having an updraft drying zone 22 and a downdraft drying zone 24; a pre-heating zone 26; a heating zone 30 comprising a first heating zone 32 and second heating zone 34; and a cooling zone 40 comprising a first cooling zone 42 and a second cooling zone 44. A separate air intake line, respectively 43 and 45, is provided to each of the cooling zones, providing air from a source 46.

Exhaust gas from the second cooling zone 44 is carried through line 60 to the updraft drying zone 22; and exhaust gas from the first cooling zone 42 is carried through line 62 selectively to the heating zone 30 or the pre-heating zone 26. Exhaust gas from the second heating zone 34 is carried via wind box recuperator fan 50 and delivered selectively to the downdraft drying zone 24, the updraft drying zone 22 and the pre-heating zone 26. Exhaust gas from the first heating zone 32, the pre-heating zone 26 and the downdraft drying zone 24 is carried through multi-clone 52, wind box exhaust fan 54, through electrostatic precipitator 56 to the stack (not shown). Other particulate removal means (not shown), depending on the operating environment, can be provided, such as further electrostatic precipitators, a cyclone system, baghouse or settling chamber. Exhaust gas from the updraft drying zone 22 is carried through hood exhaust fan 58 to the electrostatic precipitator 56 and thence to the stack (not shown).

Figure 2:
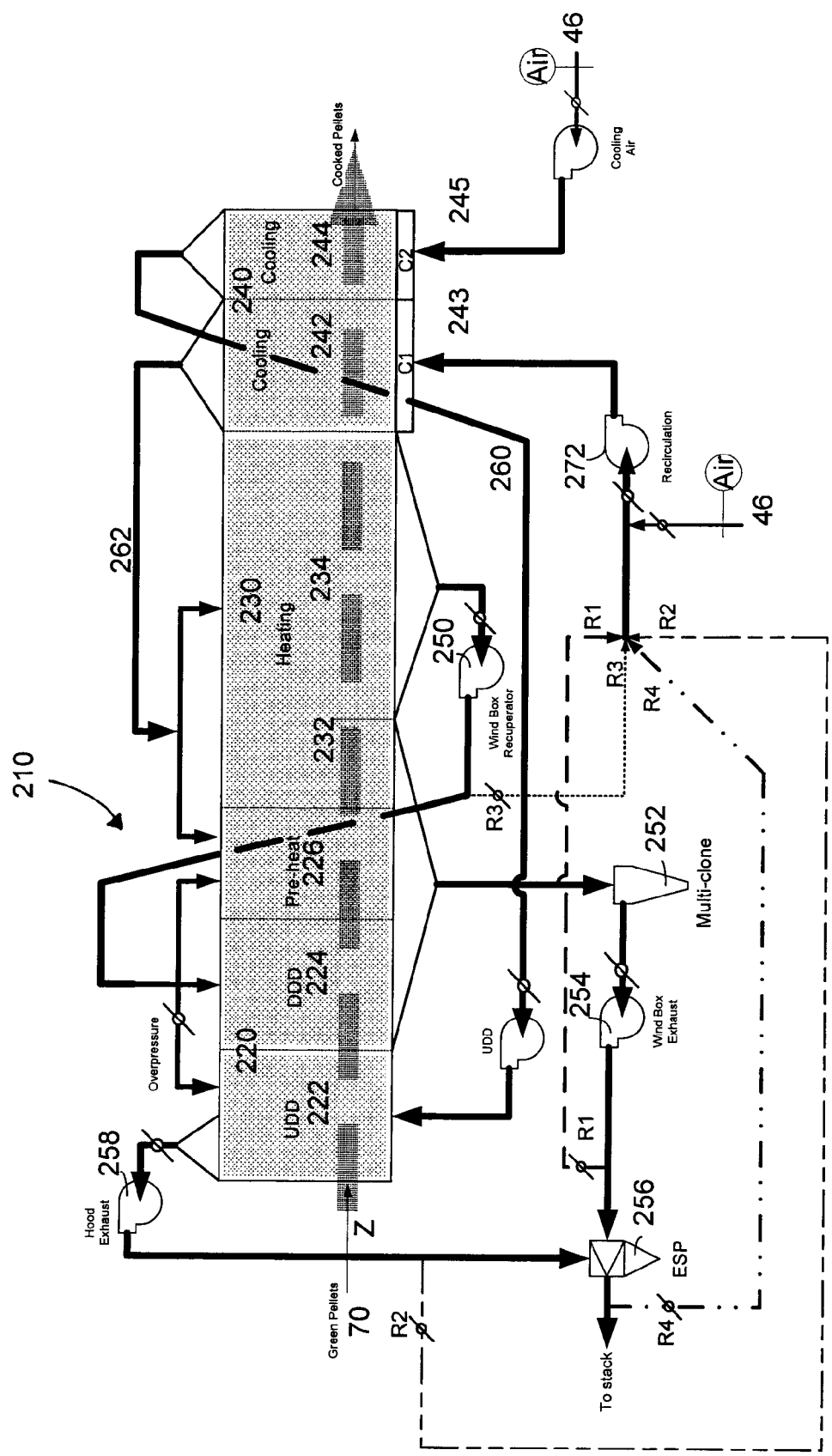
FIG. 2 shows a configuration of a recirculation system in an embodiment of the invention.

FIG. 2 shows a first exemplary embodiment of the invention, as applied to a combustion system 210, having components mostly corresponding to those shown in FIG. 1, and corresponding exhaust gas flows leaving each of the components. Thus, combustion system 210 comprises pre-combustion drying zone 220, heating zone 230, cooling zone 240, air intake lines 243, 245, wind box recuperator fan 250, multi-clone 252, wind box exhaust fan 254, electrostatic precipitator 256, and hood exhaust fan 258. Exhaust gas from the second cooling zone 244 is carried through line 260 to the updraft drying zone 222, and exhaust gas from the first cooling zone 242 is carried through line 262 selectively to the hearing zone 230 or the pre-heating zone 226.

However, each of the lines carrying the various exhaust gases from the components of the system is split, to produce recirculation lines. Thus, the exhaust gas from the downdraft drying zone 224, the pre-heating zone 226 and the first heating zone 232 is divided after wind box exhaust fan 254, to produce a first recirculation flow R1 which is carried back to intake 243 of the first cooling zone 242, and the remaining flow exits the system through electrostatic precipitator 256 as in the combustion system 10 of FIG. 1. Similarly, the exhaust flow from the updraft drying zone 222 is split after hood exhaust fan 258 to produce a second recirculation flow R2 which is carried back to intake 243 of the first cooling zone 242; the exhaust flow from the second heating zone 234 is split after wind box recuperator fan 250 to produce a third recirculation flow R3; and the exhaust flow from the electrostatic precipitator 256 is split to produce a fourth recirculation flow R4. The paths of each of the four recirculation flows R1, R2, R3 and R4 can advantageously be combined with each other as shown in FIG. 2, before being carried to the intake 243. Ambient air is provided to the second cooling zone 244 from source 46 as in the combustion system 10 of FIG. 1, and to the first cooling zone 242 by selective delivery to the combined paths of the four recirculation flows R1, R2, R3 and R4, prior to recirculation fan 272.

Figure 3:
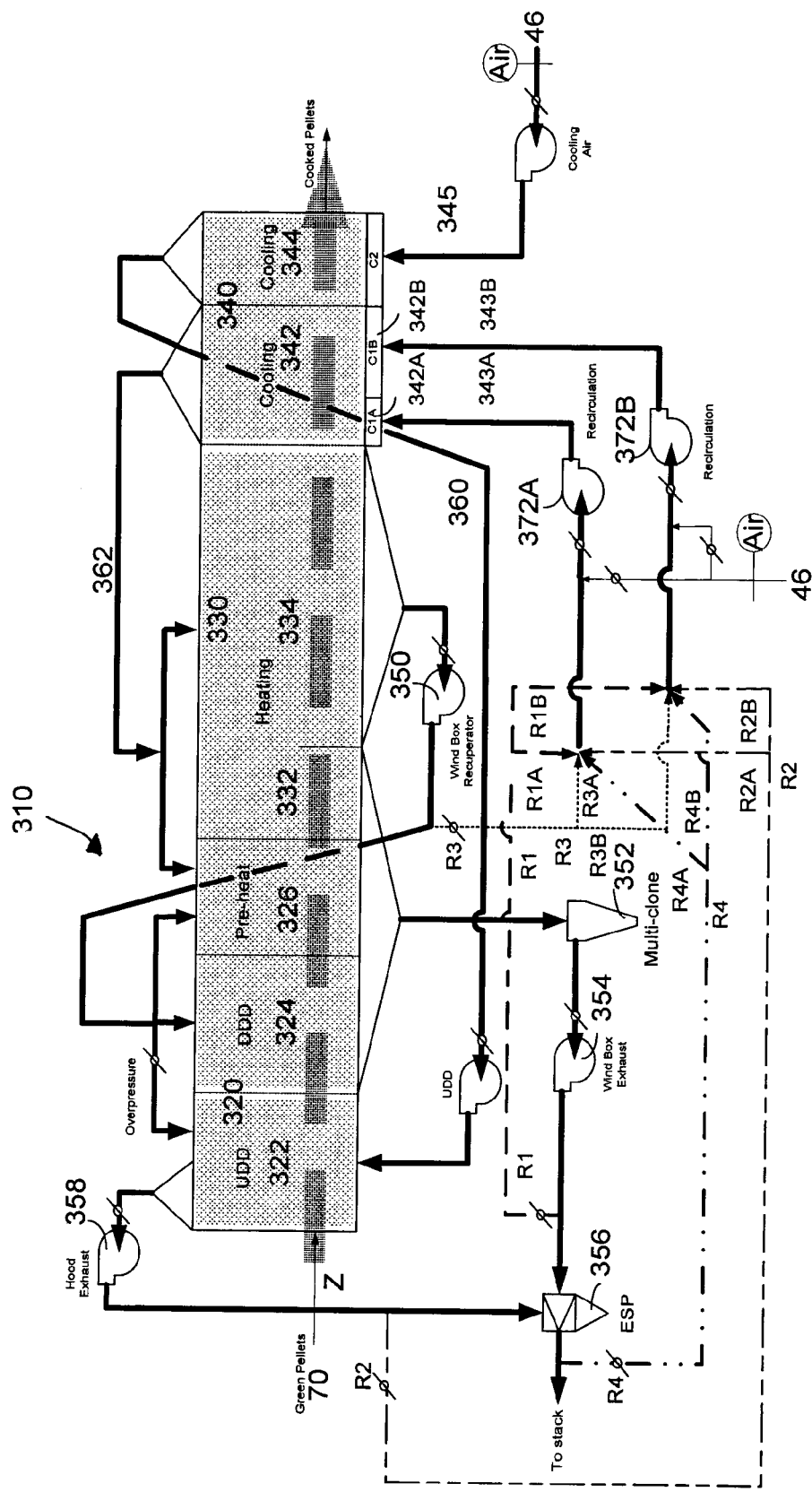
FIG. 3 shows a configuration of a recirculation system in a second embodiment of the invention.

FIG. 3 shows an alternative exemplary embodiment of the invention, in which the combustion system 310 has the same general configuration as the system 210 of FIG. 2. Thus, combustion system 310 comprises pre-combustion drying zone 320, including updraft drying zone 322 and downdraft drying zone 324, pre-heating zone 326, heating zone 330, including first heating zone 332 and second heating zone 334, cooling zone 340, air intake lines 343, 345, wind box recuperator fan 350, multi-clone 352, wind box exhaust fan 354, electrostatic precipitator 356, and hood exhaust fan 358. Exhaust gas from the second cooling zone 344 is carried through line 360 to the updraft drying zone 322, and exhaust gas from the first cooling zone 342 is carried through line 362 selectively to the hearing zone 330 or the pre-heating zone 326.

However, in the embodiment of FIG. 3, the first cooling zone 342 is divided into two sections, 342A and 342B, and each of the four recirculation flows R1, R2, R3 and R4 can be divided into two sub-flows, R1A and R1B, R2A and R2B, R3A and R3B, R4A and R4B, so that one set of sub-flows R1A, R2A, R3A and R4A is delivered to intake 343A for the first section 342A of the first cooling zone 342, and the second set of sub-flows R1B, R2B, R3B and R4B is delivered to intake 343B of the second section 342B of the first cooling zone 342. Generally it will be preferable to recirculate the hotter of the two combined recirculation flows into the first section 342A, with selective addition of ambient air from source 46 prior to recirculation fans 372A, 372B respectively.

Figure 4:
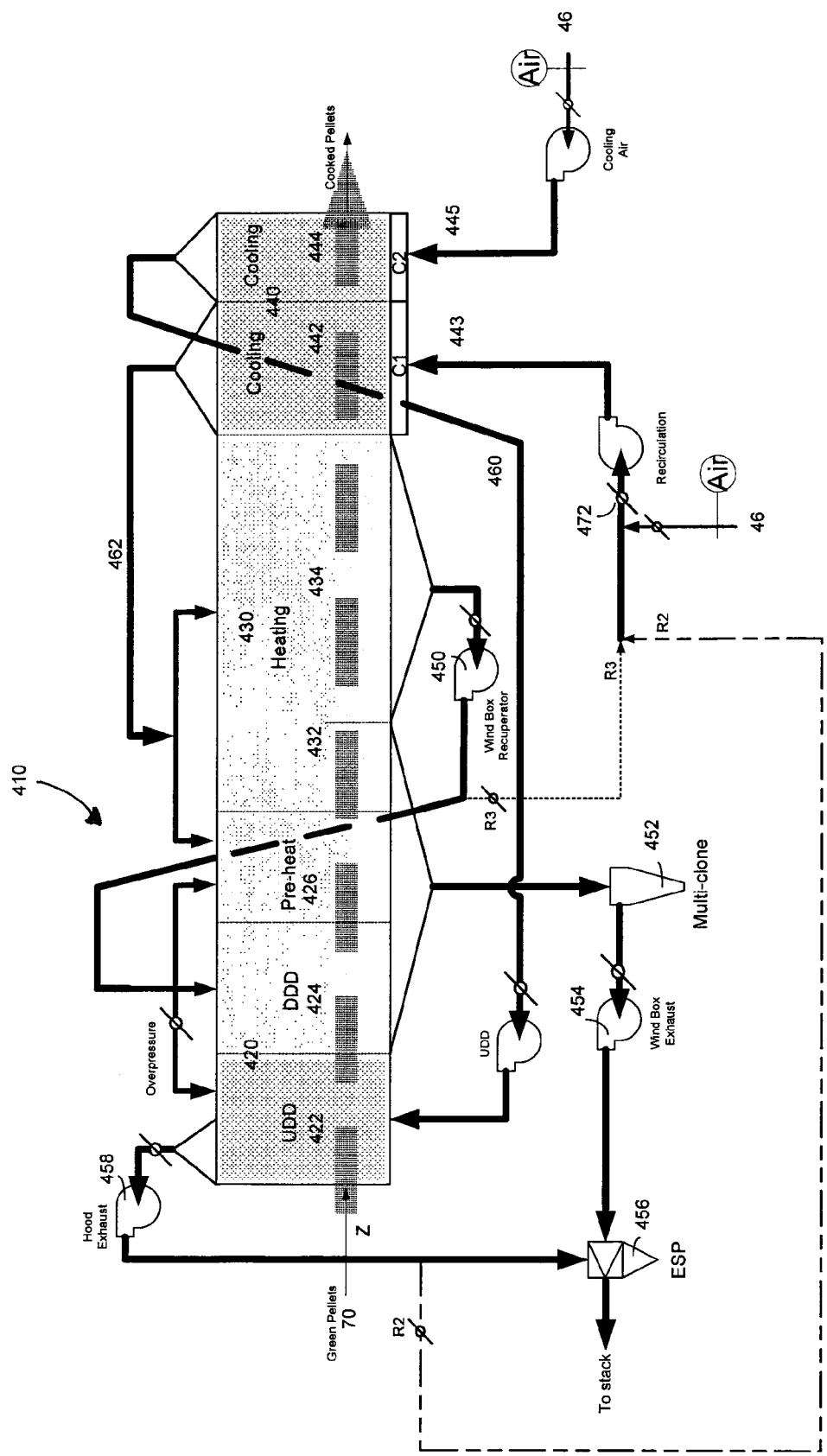
FIG. 4 shows a configuration of a recirculation system in a third embodiment of the invention.

FIG. 4 shows a further alternative exemplary embodiment of the invention, in which the combustion system 410 has the same general configuration as the system 210 of FIG. 2, and is similar to the system 310 of FIG. 3. Thus, combustion system 410 comprises pre-combustion drying zone 420, including updraft drying zone 422 and downdraft drying zone 424, pre-heating zone 426, heating zone 430, including first heating zone 432 and second heating zone 434, cooling zone 440, air intake lines 443, 445, wind box recuperator fan 450, multi-clone 452, wind box exhaust fan 454, electrostatic precipitator 456, and hood exhaust fan 458. Exhaust gas from the second cooling zone 444 is carried through line 460 to the updraft drying zone 422, and exhaust gas from the first cooling zone 442 is carried through line 462 selectively to the hearing zone 430 or the pre-heating zone 426.

However, in this embodiment, the recirculation flows comprise two options. Firstly, the exhaust flow from the second heating zone 434, comprising the overpressure stream, is split after wind box recuperator fan 450 to produce a flow R3, which is identical to the third recirculation flow R3 shown in each of FIGS. 2 and 3. In this embodiment, cooling air supplied from source 46 is directed to the second cooling zone 444, in the same manner as in the embodiments shown in FIGS. 2 and 3.

Secondly, as an additional option to third recirculation flow R3, the exhaust flow from the updraft drying zone 422 can be split after hood exhaust fan 458 to produce a second recirculation flow R2 which is carried back to intake 443 of the first cooling zone 442, in the same manner as the second recirculation flow R2 shown in each of FIGS. 2 and 3. As this stream comprises mostly air drawn from the exhaust of the second cooling zone 444, and subsequently used for moisture removal in updraft drying zone 422, it comprises mostly hot air with moisture and some particulate matter. By recirculation using the path of recirculation flow R2, in this embodiment and in the embodiments shown in FIGS. 2 and 3, a significantly reduced flow passes through the electrostatic precipitator 456, resulting in improved performance of electrostatic precipitator 456.

In each embodiment, the recirculation fans are controlled to maintain the desired pressure balance and temperatures in the heating zones 232, 234, 332, 334, 432, 434 respectively, by the provision of conventional means such as inlet dampers, variable inlet vanes or variable speed drives separately or in combination. In addition, oxygen sensors (not shown) can be installed at appropriate locations such as the stack, to monitor overall oxygen concentrations which are indicative of the flue gas recirculation rate.

In operation, for start-up until the system is stabilized, make-up ambient air is provided from source 46. As soon as the system is stabilized, flue gas recirculation is introduced gradually. Thereafter, at each zone in the system, continuous or periodic monitoring of operating conditions, in particular the temperature, will be performed, and adjustments made to the portion of each exhaust flow which is recirculated, the relative flow as between each recirculation flow or sub-flow, and the amount and location of input of ambient air to temper the flue gas or control flow at any particular location.

Various modifications can be made within the selection of combinations of appropriate recirculation paths from the various options described above in relation to the exemplary embodiments of the invention, and the selection of the relationships of the elements to provide the selected recirculation flow paths, depending on the particular operating environment, especially in the case of retrofit applications, without departing from the features of the invention.

The invention claimed is:

1. A flue gas recirculation system for a combustion system, the combustion system comprising in sequence at least one pre-combustion drying zone, at least one combustion zone, and at least a first cooling zone, the recirculation system comprising
   (i) a plurality of exhaust gas outlets comprising at least one exhaust gas outlet provided respectively to each pre-combustion drying zone and each combustion zone, and constructed and arranged to remove a gaseous flow from each said zone;
   (ii) at least one cooling zone intake means provided to each cooling zone;
   (iii) at least one flue gas delivery means each having at least one recirculation intake means and at least one delivery outlet, at least one of the plurality of exhaust gas outlets being operatively connectable to one of the recirculation intake means to selectively deliver at least part of the respective gaseous flow as a recirculation flow to the flue gas delivery means, and each delivery outlet being selectively operatively connectable to a selected one of the cooling zone intake means; and
   (iv) control means operatively connected to the flue gas delivery means to selectively control and direct the recirculation wherein the at least one cooling zone comprises a first cooling zone and a second cooling zone, and the flue gas delivery means is constructed and arranged to deliver the recirculation flow to the cooling zone intake means of the first cooling zone.

2. A recirculation system according to claim 1, wherein the at least one exhaust gas outlet operatively connectable to one of the recirculation intake means comprises a selected one of the at least one exhaust gas outlet provided to the least one combustion zone.

3. A recirculation system according to claim 1, wherein the at least one pre-combustion drying zone comprises an updraft drying zone and a downdraft drying zone.

4. A recirculation system according to claim 3, wherein the at least one exhaust gas outlet operatively connectable to one of the recirculation intake means comprises a selected one of the at least one exhaust gas outlet provided to the least one combustion zone and a selected one of the at least one exhaust gas outlet provided to the updraft drying zone.

5. A recirculation system according to claim 1, wherein the combustion system further comprises at least one pre-heating zone.

6. A system according to claim 1, wherein the combustion system is for an operational use selected from at least one of curing, drying, induration, heating, annealing and forging.

* * * * *